(12) United States Patent
Beraldo et al.

(10) Patent No.: US 9,242,898 B2
(45) Date of Patent: Jan. 26, 2016

(54) ALKALI-ACTIVATED ALUMINOSILICATE BINDER WITH SUPERIOR FREEZE-THAW STABILITY

(71) Applicant: Construction Research & Technology, GmbH, Trostberg (DE)

(72) Inventors: Samuele Beraldo, Roncade (IT); Nicola Montagner, Roncade (IT); Alessandro Dal Bo, Roncade (IT)

(73) Assignee: Construction Research & Technology GmbH, Trostberg (DE)

(*) Notice: Subject to any disclaimer, the term of this patent is extended or adjusted under 35 U.S.C. 154(b) by 0 days.

(21) Appl. No.: 14/432,624

(22) PCT Filed: Sep. 26, 2013

(86) PCT No.: PCT/EP2013/070076
§ 371 (c)(1),
(2) Date: Mar. 31, 2015

(87) PCT Pub. No.: WO2014/067721
PCT Pub. Date: May 8, 2014

(65) Prior Publication Data
US 2015/0232385 A1    Aug. 20, 2015

(30) Foreign Application Priority Data

Oct. 31, 2012  (EP) .................................. 12190780

(51) Int. Cl.
*C04B 24/12* (2006.01)
*C04B 24/04* (2006.01)

(52) U.S. Cl.
CPC .............. *C04B 24/128* (2013.01); *C04B 24/04* (2013.01); *C04B 24/121* (2013.01); *C04B 24/122* (2013.01); *C04B 24/123* (2013.01)

(58) Field of Classification Search
CPC ....................................................... C04B 12/005
See application file for complete search history.

(56) References Cited

U.S. PATENT DOCUMENTS

| | | |
|---|---|---|
| 4,349,386 A | 9/1982 | Davidovits |
| 4,472,199 A | 9/1984 | Davidovits |
| 4,509,985 A | 4/1985 | Davidovits et al. |
| 5,306,344 A | 4/1994 | Gutmann et al. |
| 8,202,362 B2 | 6/2012 | Davidovits et al. |
| 8,460,459 B2 | 6/2013 | Ellenrieder et al. |
| 2004/0206276 A1 | 10/2004 | Hill et al. |
| 2009/0199742 A1 | 8/2009 | Hill et al. |
| 2009/0199743 A1 | 8/2009 | Hill et al. |
| 2009/0199744 A1 | 8/2009 | Hill et al. |
| 2010/0010139 A1 | 1/2010 | Davidovits et al. |
| 2012/0247369 A1 | 10/2012 | Ellenrieder et al. |

FOREIGN PATENT DOCUMENTS

| | | |
|---|---|---|
| EP | 0 512 269 A2 | 11/1992 |
| EP | 1 081 114 A1 | 3/2001 |
| EP | 1 236 702 A1 | 9/2002 |
| GB | 5022 | 0/1824 |
| GB | 2 292 141 A | 2/1996 |
| WO | WO 85/03699 A1 | 8/1985 |
| WO | WO 2004/067471 A2 | 8/2004 |
| WO | WO 2008/012438 A2 | 1/2008 |
| WO | WO 2010/130582 A2 * | 11/2010 |
| WO | WO 2011/064005 A1 | 6/2011 |

OTHER PUBLICATIONS

English Translation of WO 2010/130582.*
PCT/EP2013/070076—International Search Report, mailed Feb. 25, 2014.
PCT/EP2013/070076—International Written Opinion, mailed Feb. 25, 2014.
PCT/EP2013/070076—International Preliminary Report on Patentability, issued May 5, 2015.
Gifford, et al., "Freeze-Thaw Durability of Activated Blast Furnace Slag Cement Concrete", ACI Materials Journal, May 1, 1996, pp. 242-245, vol. 93, Issue 3, Abstract Only.

* cited by examiner

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

We herewith propose the use of at least one nitrogen-containing organic compound and/or a salt thereof in combination with at least one aromatic carboxylic acid and/or a salt thereof for improving the freeze-thaw stability of an alkali-activated aluminosilicate binder, and a preferred alkali-activated aluminosilicate binder comprising ε-caprolactam and sodium benzoate as freeze-thaw stabilizers.

20 Claims, No Drawings

ALKALI-ACTIVATED ALUMINOSILICATE BINDER WITH SUPERIOR FREEZE-THAW STABILITY

CROSS REFERENCE TO RELATED APPLICATIONS

This application is a national stage application of International Application No. PCT/EP2013/070076, filed 26 Sep. 2013, which claims priority from European Patent Application No. 12190780.2, filed 31 Oct. 2012, which applications are incorporated herein by reference.

The present invention relates to the use of at least one nitrogen-containing organic compound and/or a salt thereof in combination with at least one aromatic carboxylic acid and/or a salt thereof for improving the freeze-thaw stability of an alkali-activated aluminosilicate binder, as well as a stabilized alkali-activated aluminosilicate binder.

Similar systems are described in WO 10/130582. In particular it is stated that certain organic additives (especially amines) considerably reduce the tendency of the alkali-activated aluminosilicate binder to shrink.

The stability of building products to external influences is generally of great importance. The present invention will mainly focus on the aspect of freeze-thaw stability as this is an essential feature of building products.

Freeze-thaw cycles relate to the climatic change of temperatures around the freezing point of water. Particularly in mineral binders such as concrete freeze-thaw cycles constitute a mechanism of deterioration. These construction materials exhibit a capillary porous structure and are not watertight. If a water-impregnated structure of this kind is subjected to temperatures below 0° C. the water freezes within the pores. Due to the density anomaly of water the ice now expands. This results in a deterioration of the durability of the construction material. Moreover, there is a capillary pumping effect because of the expansion and contraction of the material itself through these freeze-thaw cycles which increases water uptake and thus deterioration. The number of freeze-thaw cycles to which the building product is exposed during its service live is thus of great influence for this deterioration process. For that reason test methods were generated to simulate the effects done by freeze-thaw cycles to the building products (from http://de.wikipedia.org/wiki/Frost-Tau-Wechsel, retrieved Oct. 10, 2012). These methods (e.g. ASTM C 679-92) provide an indication of the freeze-thaw stability and therefore the durability of the building product itself.

Portland cement was mentioned for the first time in the British Patent BP 5022 and has been continually developed further since then. Modern Portland Cement contains about 70% by weight of CaO+MgO, about 20% by weight of $SiO_2$ and about 10% by weight of $Al_2O_3+Fe_2O_3$. Due to its high CaO content, it hardens hydraulically. Cured Portland Cement, however, exhibits capillary pores into which water tends to migrate during warm periods and to disintegrate the cured cement during freezing periods.

Particular slags from metallurgical processes can be used as latent hydraulic binders as additions to Portland Cement. Activation by means of strong alkalis such as alkali metal hydroxides or water glasses is also possible. They can be employed as mortars or concretes by mixing with fillers (e.g. silica sand having an appropriate particle size) and additives. Blast furnace slag, a typical latent hydraulic binder, generally comprises from 30 to 45% by weight of CaO, from about 4 to 17% by weight of MgO, from about 30 to 45% by weight of $SiO_2$ and from about 5 to 15% by weight of $Al_2O_3$, typically about 40% by weight of CaO, about 10% by weight of MgO, about 35% by weight of $SiO_2$ and about 12% by weight of $Al_2O_3$. The cured products generally have the properties of hydraulically hardening systems.

Inorganic binder systems based on reactive water-insoluble compounds based on $SiO_2$ in combination with $Al_2O_3$, which cure in aqueous alkaline medium, are likewise generally known. Such cured binder systems are also referred to as "alkali-activated aluminosilicate binders" or "geopolymers" and are described, for example, in U.S. Pat. No. 4,349,386, WO 85/03699 and U.S. Pat. No. 4,472,199. Such systems generally comprise from 50 to 60% by weight of $SiO_2$, from 20 to 25% by weight of $Al_2O_3$, no or little CaO and from 15 to 30% by weight of $M_2O$ (M=Na, K).

As reactive oxide mixture, it is possible to use microsilica, metakaolin, slags, fly ashes, activated clay or mixtures thereof. The alkaline medium for activating the binder usually comprises aqueous solutions of alkali metal carbonates, alkali metal hydroxides, alkali metal aluminates and/or soluble water glass.

WO 08/012438 describes a further geopolymer cement based on low-CaO fly ash of type F, blast furnace slag and aqueous alkali metal silicate having an $SiO_2:M_2O$ ratio of more than 1.28, preferably more than 1.45. In the examples calculated on the basis of the anhydrous oxides, from about 45 to 50% by weight of $SiO_2$, from about 20 to 26% by weight of $Al_2O_3$, from about 9 to 10% by weight of CaO and from about 3 to 4% by weight of $K_2O$ are present.

Compared to cements, geopolymers can be less expensive and more stable and may have a more favorable $CO_2$ emission balance. They generally tend to be acid-resistant but less alkali-resistant. These alkali-activated aluminosilicate binders in contrast to cement exhibit less porous surfaces and thus improved freeze-thaw stability. However, required properties such as workability, strength development, dimensional stability, texture, etc. can often be achieved only by means of complex formulations. For instance fillers, thickeners, accelerators, water retention agents, defoaming agents, and/or pigments are often employed. By virtue of these additional components the porosity often increases, which in turn decreases the freeze-thaw stability of these products.

EP 1236702 A1 describes a water glass-containing building material mixture for the production of chemicals-resistant mortars based on a latent hydraulic binder, water glass and a metal salt from the group consisting of "metal hydroxide, metal oxide, carbon-containing metal salt, sulfur-containing metal salt, nitrogen-containing metal salt, phosphorus-containing metal salt, halogen-containing metal salt" as a controlling agent. The latent hydraulic constituent can be granulated blast furnace slag. Alkali metal salts, in particular lithium salts, are mentioned and used as the metal salt.

EP 1081114 A1 describes a building material mixture for producing chemical-resistant mortars, where the building material mixture contains water glass powder and at least one water glass hardener. Furthermore, over 10% by weight of at least one latent hydraulic binder are present, and the building material mixture comprises at least one inorganic filler.

WO 11/064005 describes systems in which the binder cures in the form of a hybrid matrix in which a calcium silicate hydrate matrix and a geopolymer matrix are present in an appropriate ratio to one another and thus interpenetrate so that the overall matrix is both acid-resistant and alkali-resistant. However, the content of a nitrogen-containing organic compound and/or a salt thereof and an aromatic carboxylic acid and/or a salt thereof according to the present invention is absent in these binder systems.

According to EP 0512269 A2, for large-area coating of various substrates in the building trade, a mixture of alkaline silicate solution, pulverulent latent-hydraulic material and additives is applied, for example by the dense-flow spraying process. The additives comprise inert additives and/or opening materials or fillers, reinforcing agents, setting accelerators and moisture regulators. The cured coating material has a high mechanical, thermal and chemical stability. Alcohols, amines and/or alkanolamines are used as moisture regulators.

The inventors have set themselves the task of substantially avoiding at least some of the disadvantages of the prior art as discussed above. In particular, it was an object of the invention to substantially improve the freeze-thaw stability of an alkali-activated aluminosilicate binder.

The abovementioned object is achieved by the features of the independent claims. The dependent claims relate to preferred embodiments.

It has been surprisingly found that the nitrogen-containing organic compound together with the aromatic carboxylic acid and/or their respective salts synergistically improve the freeze-thaw stability of alkali-activated aluminosilicate binders.

The present invention thus provides as a first subject matter the use of at least one nitrogen-containing organic compound and/or a salt thereof in combination with at least one aromatic carboxylic acid and/or a salt thereof for improving the freeze-thaw stability of an alkali-activated aluminosilicate binder.

The nitrogen-containing organic compound suitable for the purpose of the present invention is suitably selected from the group consisting of amines, imidazoles, guanidines, amides, imides, lactams, amino alcohols, amino acids, and betaines.

Amines can be selected from among primary, secondary and tertiary amines, and the amine salts are selected from among salts of primary, secondary and tertiary amines and also quaternary ammonium salts. The amines can be aliphatic and/or aromatic amines. Tertiary amines are possible, secondary amines are preferred and primary amines are particularly preferred. In the case of amines the system should not contain any curable epoxides. Generally the system should not contain any alkyl siliconates.

The molecular weight of the amines used can vary within a wide range. Relatively high molecular weight compounds such as polyvinylamines and polyethylenimines, which can be obtained, for example, from BASF SE under the trade names Lupamin® and Lupasol®, respectively, are suitable. Low molecular weight amines having a molecular weight of less than 400 g/mol, preferably less than 300 g/mol and in particular less than 200 g/mol, are particularly suitable for the purpose of the present invention.

Preferably, the nitrogen-containing organic compound suitable for the purpose of the present invention can be selected from the group consisting of propylamine, butylamine, pentylamine, hexylamine, ethylenediamine, diaminopropane, diaminobutane, diaminopentane, neo-pentanediamine, diaminohexane, diethylenetriamine, tetraethylenepentamine, N,N,N',N'-tetramethyl-ethylenediamine, hexamethylenetetramine, 3-ethoxypropylamine, 2-(diethylamino)ethylamine, 3-(methylamino)propylamine, 3-(di-methylamino)propylamine, dibutylamine, 4,9-dioxadodecane-1,12-diamine, bis-(2-dimethylaminoethyl)ether, polyetheramines (such as Polyetheramine D 230 from BASF SE), morpholine, N-ethylmorpholine, 2-pyrrolidone, N-methylpyrrolidone, imidazolidone, imidazolidone hemihydrate, 2-piperidone, N,N'-dimethylpiperazine, melamine, 1,3,5-triazine, 2,4-diamino-1,3,5-triazine, ε-caprolactam, urea, and betaine.

ε-Caprolactam is most preferred because it is in powder form and easily miscible in a powder mixture. Moreover, it is cheap and odorless. Many amines are liquid and often less miscible or stable in a high pH aluminosilicate binder.

Furthermore, the nitrogen-containing organic compound suitable for the purpose of the present invention can be selected from the group of imidazoles. The molecular weight of the imidazoles used can vary within a wide range. Imidazoles having a molecular weight of less than 400 g/mol, in particular less than 200 g/mol, are particularly suitable for the purpose of the present invention. Preference is given to an imidazole from the group consisting of imidazole, N-(3-aminopropyl)imidazole, 1-methylimidazole, 1-ethylimidazole, 1-propylimidazole, 1-butylimidazole, 1-ethyl-3-methylimidazole, 1-n-butyl-3-ethylimidazole, 1,3-dimethylimidazole, 1,2,3-trimethylimidazole, 1-n-butyl-3-methylimidazole, 1,3,4,5-tetramethylimidazole, 1,3,4-trimethylimidazole, 1,2-dimethylimidazole, 1-butyl-2,3-dimethylimidazole, 3,4-dimethylimidazole, 2-ethyl-3,4-dimethylimidazole, 3-methyl-2-ethylimidazole, 3-butyl-1-methylimidazole, 3-butyl-1-ethylimidazole, 3-butyl-1,2-dimethylimidazole, 1,3-di-n-butylimidazole, 3-butyl-1,4,5-trimethylimidazole, 3-butyl-1,4-dimethylimidazole, 3-butyl-2-methylimidazole, 1,3-dibutyl-2-methylimidazole, 3-butyl-4-methylimidazole, 3-butyl-2-ethyl-4-methylimidazole, 3-butyl-2-ethylimidazole, 1-methyl-3-octylimidazole and 1-decyl-3-methylimidazole.

The nitrogen-containing organic compound suitable for the purpose of the present invention can also be selected from the group of guanidines. The molecular weight of the guanidines used can vary within a wide range. For the purpose of the present invention, guanidines having molecular weights of less than 400 g/mol, in particular less than 150 g/mol, are particularly suitable. Preference is given to at least one guanidine from the group consisting of 1,1,3,3-tetramethylguanidine, 1,1-dimethylguandine and 1,1-diethylguanidine.

The nitrogen-containing organic compound suitable for the purpose of the present invention can also be an amide such as N,N-dimethylformamide, an imide such as maleimide, phtalimide, and succinimide, a lactam such as ε-caprolactam, δ-valerolactam, 2-pyrrolidone, 1-methyl-2-pyrrolidone or an amino alcohol. The molecular weight of the amino alcohols used can vary within a wide range. Amino alcohols having a molecular weight of less than 400 g/mol, in particular less than 150 g/mol, are particularly suitable for the purpose of the present invention. Preference is given to an amino alcohol from the group consisting of 3-amino-1-propanol, monoethanolamine, triethanolamine, choline, trimethylaminoethylethanolamine, 1-(2-hydroxyethyl)piperazine, 2-(2-aminoethoxy) ethanol, 3-dimethylaminopropan-1-ol, 4-(2-hydroxyethyl)morpholine, butyldiethanolamine, butylethanolamine, dimethylaminoethoxyethanol, N,N-dimethylethanolamine, N-methylethanolamine, diethanolamine, diisopropanolamine and N-(2-hydroxyethyl)-2-pyrrolidone.

Moreover, the salt of the nitrogen-containing organic compound can be a hydrogen halide salt or a quaternary ammonium salt. A preferred hydrogen halide would be hydrochloric acid. Quaternization of the nitrogen-containing organic compound may be effected e.g. by reaction of the nitrogen-containing organic compound with methyl chloride or dimethyl sulfate.

Imidazolium salts, guanidinium salts and quaternary ammonium salts are highly suitable for the purpose of the present invention. Salts of this type having melting points below 100° C. are also referred to as ionic liquids. The molecular weight can be varied within a wide range. Ionic liquids having a molecular weight of less than 400 g/mol, in particular less than 200 g/mol, are particularly suitable for the purpose of the present invention.

For the purpose of the present invention, the ionic liquids are preferably salts having at least one cation selected from the group consisting of choline, tris-2-(hydroxyethyl)-methylammonium, methyl-tri-n-butylammonium, tetramethylammonium, tetrabutylammonium, 1-methylimidazolium, 1-ethylimidazolium, 1-propylimidazolium, 1-butylimidazolium, 2-ethylpyridinium, 1-ethyl-3-methylimidazolium, 1-n-butyl-3-ethylimidazolium, 1,2-dimethylpyridinium, 1-methyl-2-ethylpyridinium, 1-methyl-2-ethyl-6-methylpyridinium, N-methylpyridinium, 1-butyl-2-methylpyridinium, 1-butyl-2-ethylpyridinium, 1-butyl-2-ethyl-6-methylpyridinium, N-butylpyridinium, 1-butyl-4-methylpyridinium, 1,3-dimethylimidazolium, 1,2,3-trimethylimidazolium, 1-n-butyl-3-methylimidazolium, 1,3,4,5-tetramethylimidazolium, 1,3,4-trimethylimidazolium, 1,2-dimethylimidazolium, 1-butyl-2,3-dimethylimidazolium, 3,4-dimethylimidazolium, 2-ethyl-3,4-dimethylimidazolium, 3-methyl-2-ethylimidazolium, 3-butyl-1-methylimidazolium, 3-butyl-1-ethylimidazolium, 3-butyl-1,2-dimethylimidazolium, 1,3-di-n-butylimidazolium, 3-butyl-1,4,5-trimethylimidazolium, 3-butyl-1,4-dimethylimidazolium, 3-butyl-2-methylimidazolium, 1,3-dibutyl-2-methylimidazolium, 3-butyl-4-methylimidazolium, 3-butyl-2-ethyl-4-methylimidazolium, 3-butyl-2-ethylimidazolium, 1-methyl-3-octylimidazolium, 1-decyl-3-methylimidazolium and guanidinium and also at least one anion selected from the group consisting of chloride, bromide, iodide, acetate, methylsulfate, methanesulfonate, tosylate, sulfate, hydrogensulfate, phosphate, hydrogenphosphate, dihydrogenphosphate, dialkylphosphate and bis(trifluoromethanesulfonyl) imide.

The aromatic carboxylic acid which is suitable for the purpose of the present invention can be selected from the group consisting of benzoic acid, phthalic acid, isophthalic acid, terephthalic acid, salicylic acid, and toluic acid.

Moreover, the salt of the aromatic carboxylic acid is suitably selected from the group consisting of alkali metal salts, alkaline earth metal salts, aluminum salts, first row transition metal salts, and mixtures thereof. The term "first row transition metal" is meant to indicate the transition metals from Sc to Zn. Sodium benzoate is particularly preferred because it is relatively cheap, easily available and performs nicely.

The alkali-activated aluminosilicate binder comprises at least one latent hydraulic and/or pozzolanic binder and at least one salt selected from among alkali metal oxides, alkali metal hydroxides, alkali metal carbonates, alkali metal silicates, alkali metal aluminates, and mixtures thereof.

The latent hydraulic binder is, for example, selected from among slags, in particular blast furnace slag, granulated blast furnace slag, ground granulated blast furnace slag, electrothermal phosphorus slag, steel slag and mixtures thereof. The slags can be either industrial slags, i.e. waste products from industrial processes, or synthetically produced slags. The latter is advantageous since industrial slags are not always available in a constant amount and quality.

For the purpose of the present invention a "latent hydraulic binder" is preferably a binder in which the molar ratio of (CaO+MgO):$SiO_2$ is in the range from 0.8 to 2.5 and particularly preferably in the range from 1.0 to 2.0.

Blast furnace slag is a waste product of the blast furnace process. Granulated blast furnace slag is sometimes called slag sand. Ground granulated blast furnace slag varies in fineness and particle size distribution depending on origin and treatment form, with the fineness having an influence on the reactivity. As a measure of the fineness, use is made of the Blaine value which is typically in the order of from 200 to 1000, preferably from 300 to 500 $m^2\ kg^{-1}$. The more finely the blast furnace slag is milled, the higher the reactivity. The typical composition of blast furnace slag has been mentioned above.

Electrothermal phosphorus slag is a waste product of electrothermal phosphorus production. It is less reactive than blast furnace slag and contains from about 45 to 50% by weight of CaO, from about 0.5% to 3% by weight of MgO, from about 38 to 43% by weight of $SiO_2$, from about 2 to 5% by weight of $Al_2O_3$ and from about 0.2 to 3% by weight of $Fe_2O_3$ and also fluoride and phosphate. Steel slag is a waste product of various steel production processes and has a greatly variable composition (see Caijun Shi, Pavel V. Krivenko, Della Roy, Alkali-Activated Cements and Concretes, Taylor & Francis, London & New York, 2006, pp. 42-51).

The pozzolanic binder is, for example, selected from among amorphous silica, preferably precipitated silica, pyrogenic silica and microsilica, glass flour, fly ash, for example brown coal fly ash and mineral coal fly ash, metakaolin, natural pozzolanas such as tuff, trass and volcanic ash, natural and synthetic zeolites and mixtures thereof. An overview of pozzolanic binders which are suitable for the purpose of the present invention may also be found in Caijun Shi, Pavel V. Krivenko, Della Roy, pp. 51-63.

The amorphous silica is preferably a X-ray amorphous silica, i.e. a silica which displays no crystallinity in the powder diffraction pattern. For the purpose of this invention, glass flour should likewise be regarded as amorphous silica.

The amorphous silica used according to the invention suitably has an $SiO_2$ content of at least 80% by weight, preferably at least 90% by weight. Precipitated silica is obtained industrially from waterglass via precipitation processes. Depending on the production process, precipitated silica is also referred to as silica gel. Pyrogenic silica is produced by reaction of chlorosilanes such as silicon tetrachloride in an oxyhydrogen flame. Pyrogenic silica is an amorphous $SiO_2$ powder having a particle diameter of from 5 to 50 nm and a specific surface area of from 50 to 600 $m^2\ g^{-1}$.

Microsilica is a by-product of silicon or ferrosilicon manufacture and likewise consists largely of amorphous $SiO_2$ powder. The particles have diameters in the order of about 0.1 µm. The specific surface area is in the order of from 15 to 30 $m^2\ g^{-1}$. On the other hand, commercial silica sand is crystalline and has comparatively large particles and a comparatively low specific surface area. It is used according to the invention as inert aggregate.

Fly ashes are formed, inter alia, in the combustion of coal in power stations. Fly ash of class C contains, according to WO 08/012438, about 10% by weight of CaO, while fly ashes of class F contain less than 8% by weight, preferably less than 4% by weight and typically about 2% by weight, of CaO.

Metakaolin is formed in the dehydration of kaolin. While kaolin gives off physically bound water at from 100 to 200° C., dehydroxylation with breakdown of the lattice structure and formation of metakaolin ($Al_2Si_2O_7$) takes place at from 500 to 800° C. Pure metakaolin accordingly contains about 54% by weight of $SiO_2$ and about 46% by weight of $Al_2O_3$.

The above mentioned salt, which is selected from among alkali metal oxides, alkali metal hydroxides, alkali metal carbonates, alkali metal silicates, and alkali metal aluminates, acts as an alkaline activator for the latent hydraulic and/or pozzolanic binder. Alkali metal hydroxides and alkali metal silicates are preferred.

The alkali metal silicate is suitably selected from among compounds having the empirical formula m $SiO_2$.$nM_2O$, wherein M is Li, Na, K or $NH_4$, or a mixture thereof, preferably Na or K. (Ammonium is to be comprised herein although it is not an alkali metal.) The molar ratio of m:n is from 0.5 to 3.6, preferably from 0.6 to 3.0 and in particular from 0.7 to 2.0.

Moreover, the alkali metal silicate is suitably a water glass, preferably a liquid water glass and in particular a sodium or potassium water glass.

The ratio of m:n (also referred to as modulus) as indicated above should preferably not be exceeded since otherwise a complete reaction of the components can no longer be expected. It is also possible to employ lower moduli, e.g. about 0.2. Water glasses having higher moduli should be brought to moduli in the range according to the invention by means of a suitable aqueous alkali metal hydroxide before use.

Potassium water glasses in the suitable modulus range are commercially available mainly as aqueous solutions since they are highly hygroscopic; sodium water glasses in the suitable modulus range are also commercially available as solids. The solids content of the aqueous water glass solutions is generally from 20% by weight to 60% by weight, preferably from 30 to 50% by weight.

Water glasses can be prepared industrially by melting of silica sand with the corresponding alkali metal carbonates. However, they can also be obtained without difficulty from mixtures of reactive silica with the corresponding aqueous alkali metal hydroxides. It is therefore possible, according to the invention, to replace at least part of the alkali metal silicate by a mixture of a reactive silica and the corresponding alkali metal hydroxide.

In addition, a small amount of a hydraulic binder can be present. The hydraulic binder is suitably selected from among cements, in particular Portland Cement, aluminate cement, and also mixtures thereof.

As indicated hereinabove, Portland Cement contains about 70% by weight of CaO+MgO, about 20% by weight of $SiO_2$ and about 10% by weight of $Al_2O_3+Fe_2O_3$. Aluminate cement (high alumina cement) contains from about 20 to 40% by weight of CaO, up to about 5% by weight of $SiO_2$, from about 40 to 80% by weight of $Al_2O_3$ and up to about 20% by weight of $Fe_2O_3$. These types of cement are well known in the prior art.

The ratio of the nitrogen-containing organic compound and/or salt thereof to the aromatic carboxylic acid and/or salt thereof is suitably comprised within the range of from 1:1 to 1:10, preferably from 1:5 to 1:10.

A preferred alkali-activated aluminosilicate binder which is suitable for the purpose of the present invention comprises 5 to 95, preferably 20 to 80% by weight of the latent hydraulic and/or pozzolanic binder, 5 to 50, preferably 10 to 40% by weight of the alkali metal silicate, 0.01 to 30, preferably 0.1 to 10 and in particular 0.1 to 3% by weight of the nitrogen-containing organic compound and/or a salt thereof, 0.01 to 30, preferably 0.1 to 10 and in particular 0.5 to 5% by weight of the aromatic carboxylic acid and/or a salt thereof, and 0 to 20, preferably 0 to 10 and in particular 0 to 5% by weight of the hydraulic binder. Moreover, from 0 to 90%, preferably from 30 to 70% by weight of inert fillers and/or from 0 to 15% by weight of additives can be present. The above proportions are to be selected in a way that they add up to 100% by weight.

Possible inert fillers are e.g. gravels, sands and flours, for example those based on silica, limestone, barite or clay, in particular silica sand. Lightweight fillers such as perlite, kieselguhr (diatomaceous earth), expanded mica (vermiculite) and foam sand can also be used.

Possible additives are e.g. plasticizers, antifoams, water retention agents, dispersants, pigments, fibers, redispersible powders, wetting agents, water proofing additives, set retarders, curing accelerators, complexing agents, and rheology modifiers.

The amount of water required for setting is for the purpose of this invention not counted as a constituent of the binder. Generally from 10 to 50%, preferably from about 25 to about 35% by weight of water, based on 100% of alkali-activated aluminosilicate binder, is required for setting.

The alkali-activated aluminosilicate binder can be comprised in building material formulations and/or building products such as on-site concrete, finished concrete parts, concrete goods, concrete blocks and also in-situ concrete, spray concrete, ready-mixed concrete, building adhesives and thermal insulation composite system adhesives, concrete repair systems, one-component and two-component sealing slurries, screeds, knifing fillers and self-leveling compositions, tile adhesives, plasters and renders, adhesives and sealants, coating systems, in particular for tunnels, wastewater channels, spray protection and condensate lines, dry mortars, joint grouts, drainage mortars and/or repair mortars.

Moreover, the present invention provides as a further subject matter an alkali-activated aluminosilicate binder comprising blast furnace slag, granulated blast furnace slag and/or ground granulated blast furnace slag as a latent hydraulic binder, microsilica, metakaolin and/or fly ash as a pozzolanic binder, sodium waterglass and/or potassium waterglass as an alkaline activator, and ε-caprolactam and sodium benzoate as freeze-thaw stabilizers.

The invention will now be illustrated by means of the following examples.

EXAMPLES 1-12

10.0 g of ground granulated blast furnace slag (Blaine value about 3860 $cm^2/g$) and 20.0 g of microsilica (Fumed Silica, BET value about 11.6 $m^2/g$) were homogenized and then mixed with 20.0 g of liquid aqueous potassium waterglass (modulus 1.0, solids content 52%). The freeze-thaw stabilizers according to Table 1, if any, and 60 g of quartz sand were added and further mixed. Prismatic test specimens (4×2×16 cm) were molded and, after 24 h, were cured for 13 days at 60% relative humidity and 20° C. The test specimens were subjected to 10, 15, 20 and 30 freeze-thaw cycles. The cycles were carried out according to ASTM C 679-92, i.e. 16 h at −19° C. and 8 h at +23° C. while the specimens were in a bath of 4% b.w. of aqueous $CaCl_2$ solution.

The respective weight losses in percent are listed in Table 1 hereinbelow. It can be seen that, starting from a formulation without freeze-thaw stabilizers, the addition of a nitrogen-containing organic compound or sodium benzoate separately provides only a small improvement while the addition of a nitrogen-containing organic compound in combination with sodium benzoate provides an significant increase which is often higher than the sum of the improvements of the individual additions.

EXAMPLES 13-18

The procedure of Examples 1-12 was followed with varying concentrations of sodium benzoate and ε-caprolactam. The results are shown in Table 2 hereinbelow. It can be seen that, starting from a formulation without freeze-thaw stabilizers, the addition of 1% or even 2% b.w. of sodium benzoate or ε-caprolactam separately provided a much smaller improvement in freeze-thaw stability than the addition of 1% sodium benzoate in combination with 1% ε-caprolactam. This finding unambiguously proves the existence of a synergistic effect.

sisting of benzoic acid, phthalic acid, isophthalic acid, terephthalic acid, salicylic acid, and toluic acid.

TABLE 1

| Example | | Weight Loss [%] vs. Number of Freeze-Thaw Cycles | | | |
|---|---|---|---|---|---|
| No. | Freeze-Thaw Stabilizers | 10 | 15 | 20 | 30 |
| 1 | no sodium benzoate   no amine | 41.0 | 59.3 | 71.6 | 89.0 |
| 2 | 2% sodium benzoate   no amine | 20.9 | 30.4 | 38.7 | 50.5 |
| 3 | no sodium benzoate   0.4% ε-caprolactam | 27.0 | 42.4 | 52.7 | 67.5 |
| 4 | 2% sodium benzoate   0.4% ε-caprolactam | 5.4 | 6.0 | 6.8 | 16.1 |
| 5 | 2% sodium benzoate   0.4% bis(2-hydroxylpropyl)amine | 4.3 | 5.3 | 8.4 | 10.2 |
| 6 | 2% sodium benzoate   0.4% triethanolamine | 7.7 | 7.7 | 9.4 | 10.2 |
| 7 | 2% sodium benzoate   0.4% polyetylenimine | 15.0 | 16.0 | 19.0 | 33.0 |
| 8 | 2% sodium benzoate   0.4% 2-[(1-methylpropyl)amino]ethanol | 14.0 | 16.0 | 17.0 | 28.0 |
| 9 | 2% sodium benzoate   0.4% betaine | 1.6 | 1.6 | 1.6 | 3.0 |
| 10 | 2% sodium benzoate   0.4% triisopropanolamine | 1.5 | 1.5 | 1.6 | 2.8 |
| 11 | 2% sodium benzoate   0.4% 1-ethyl 2-pyrrolidone | 5.6 | 5.6 | 12.6 | 18.7 |
| 12 | 2% sodium benzoate   0.4% N-butyl ethanolamine (>90%) | 3.5 | 3.7 | 6.0 | 6.8 |

TABLE 2

| Example | | Weight Loss [%] vs. Number of Freeze-Thaw Cycles | | | |
|---|---|---|---|---|---|
| No. | Freeze-Thaw Stabilizers | 10 | 15 | 20 | 30 |
| 13 | no sodium benzoate   no amine | 41.0 | 59.3 | 71.6 | 89.0 |
| 14 | 1% sodium benzoate   no amine | 23.4 | 31.7 | 45.9 | 57.8 |
| 15 | 2% sodium benzoate   no amine | 20.8 | 28.3 | 39.2 | 48.4 |
| 16 | no sodium benzoate   1% ε-caprolactam | 19.3 | 24.0 | 35.1 | 42.2 |
| 17 | no sodium benzoate   2% ε-caprolactam | 16.4 | 20.9 | 27.1 | 31.5 |
| 18 | 1% sodium benzoate   1% ε-caprolactam | 7.6 | 8.4 | 10.5 | 16.3 |

The invention claimed is:

1. A process for improving the freeze-thaw stability of an alkali-activated aluminosilicate binder comprising the addition to the alkali-activated aluminosilicate binder of at least one nitrogen-containing organic compound and/or a salt thereof in combination with at least one aromatic carboxylic acid and/or a salt thereof.

2. The process according to claim 1, characterized in that the nitrogen-containing organic compound is selected from the group consisting of amines, imidazoles, guanidines, amides, imides, lactams, amino alcohols, amino acids, and betaines.

3. The process according to claim 1, characterized in that the nitrogen-containing organic compound is selected from the group consisting of propylamine, butylamine, pentylamine, hexylamine, ethylenediamine, diaminopropane, diaminobutane, diaminopentane, neo-pentanediamine, diaminohexane, diethylenetriamine, tetraethylenepentamine, N,N,N',N'-tetramethyl-ethylenediamine, hexamethylenetetramine, 3-ethoxypropylamine, 2-(diethylamino)ethylamine, 3-(methylamino)propylamine, 3-(dimethylamino)propylamine, dibutylamine, 4,9-dioxadodecane-1,12-diamine, bis-(2-dimethylaminoethyl) ether, polyetheramines, morpholine, N-ethylmorpholine, 2-pyrrolidone, N-methylpyrrolidone, imidazolidone, imidazolidone hemihydrate, 2-piperidone, N,N'-dimethylpiperazine, melamine, 1,3,5-triazine, 2,4-diamino-1,3,5-triazine, ε-caprolactam, urea, and betaine.

4. The process according to claim 1, characterized in that the salt of the nitrogen-containing organic compound is a hydrogen halide salt or a quaternary ammonium salt.

5. The process according to claim 1, characterized in that the aromatic carboxylic acid is selected from the group con- 6. The process according to claim 1, characterized in that the salt of the aromatic carboxylic acid is selected from the group consisting of alkali metal salts, alkaline earth metal salts, aluminum salts, first row transition metal salts, and mixtures thereof.

7. The process according to claim 1, characterized in that the alkali-activated aluminosilicate binder comprises at least one latent hydraulic and/or pozzolanic binder and at least one salt selected from the group consisting of alkali metal oxides, alkali metal hydroxides, alkali metal carbonates, alkali metal silicates, alkali metal aluminates, and mixtures thereof.

8. The process according to claim 7, characterized in that the latent hydraulic binder is selected from the group consisting of industrial and synthetic slags, blast furnace slag, granulated blast furnace slag, ground granulated blast furnace slag, electrothermal phosphorus slag, steel slag, and mixtures thereof.

9. The process according to claim 7, characterized in that the pozzolanic binder is selected from the group consisting of amorphous silica, precipitated silica, pyrogenic silica, microsilica, glass flour, fly ash, brown coal fly ash, mineral coal fly ash, metakaolin, natural pozzolanas, tuff, trass, volcanic ash, natural zeolites, synthetic zeolites, and mixtures thereof.

10. The process according to claim 7, characterized in that the alkali metal silicate is selected from the group consisting of compounds having the empirical formula m $SiO_2$.n $M_2O$, wherein M is Li, Na, K or $NH_4$ or a mixture thereof.

11. The process according to claim 10, characterized in that the molar ratio of m:n is from 0.5 to 3.6.

12. The process according to claim 7, characterized in that a hydraulic binder selected from the group consisting of cements, Portland Cement, aluminate cement, and mixtures thereof, is additionally present.

13. The process according to claim 7, characterized in that the ratio of the nitrogen-containing organic compound and/or salt thereof to the aromatic carboxylic acid and/or salt thereof is within the range of from 1:1 to 1:10.

14. The process according to claim 1, characterized in that the alkali-activated aluminosilicate binder comprises
- 5 to 95% by weight of latent hydraulic and/or pozzolanic binder,
- 5 to 50% by weight of alkali metal silicate,
- 0.01 to 30% by weight of the nitrogen-containing organic compound and/or a salt thereof,
- 0.01 to 30% by weight of the aromatic carboxylic acid and/or a salt thereof, and
- 0 to 20% by weight of hydraulic binder.

15. The process according to claim 1, characterized in that the alkali-activated aluminosilicate binder is comprised in building material formulations, building products, on-site concrete, finished concrete parts, concrete goods, concrete blocks, in-situ concrete, spray concrete, ready-mixed concrete, building adhesives, thermal insulation composite system adhesives, concrete repair systems, one-component sealing slurries, two-component sealing slurries, screeds, knifing fillers, self-leveling compositions, tile adhesives, plasters, renders, adhesives, sealants, coating systems, dry mortars, joint grouts, drainage mortars, repair mortars, and/or coating systems for tunnels, wastewater channels, spray protection or condensate lines.

16. Alkali-activated aluminosilicate binder comprising blast furnace slag, granulated blast furnace slag and/or ground granulated blast furnace slag as a latent hydraulic binder, microsilica, metakaolin and/or fly ash as a pozzolanic binder, sodium waterglass and/or potassium waterglass as an alkaline activator, and $\epsilon$-caprolactam and sodium benzoate as freeze-thaw stabilizers.

17. The process according to claim 10, characterized in that the molar ratio of m:n is from 0.6 to 3.0.

18. The process according to claim 10, characterized in that the molar ratio of m:n is from 0.7 to 2.5.

19. The process according to claim 7, characterized in that the ratio of the nitrogen-containing organic compound and/or salt thereof to the aromatic carboxylic acid and/or salt thereof is comprised within the range of from 1:5 to 1:10.

20. The process according to claim 1, characterized in that the alkali-activated aluminosilicate binder comprises
- 20 to 80% by weight of latent hydraulic and/or pozzolanic binder,
- 10 to 40% by weight of alkali metal silicate,
- 0.1 to 10% by weight of the nitrogen-containing organic compound and/or a salt thereof,
- 0.1 to 10% by weight of the aromatic carboxylic acid and/or a salt thereof, and
- 0 to 10% by weight of hydraulic binder.

* * * * *